United States Patent
Barkan et al.

(10) Patent No.: US 12,153,995 B2
(45) Date of Patent: Nov. 26, 2024

(54) METHOD TO LIMIT DECODE VOLUME

(71) Applicant: ZEBRA TECHNOLOGIES CORPORATION, Lincolnshire, IL (US)

(72) Inventors: Edward Barkan, Miller Place, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/104,024

(22) Filed: Jan. 31, 2023

(65) Prior Publication Data
US 2024/0256805 A1    Aug. 1, 2024

(51) Int. Cl.
G06K 7/10    (2006.01)
(52) U.S. Cl.
CPC .................. G06K 7/10732 (2013.01)
(58) Field of Classification Search
CPC .................................................. G06K 7/10732
USPC .................................................... 235/462.42
See application file for complete search history.

(56) References Cited

U.S. PATENT DOCUMENTS

| | | | | |
|---|---|---|---|---|
| 6,283,375 | B1* | 9/2001 | Wilz, Sr. ............ | G06K 17/0022 235/472.01 |
| 2003/0062413 | A1 | 4/2003 | Gardiner et al. | |
| 2012/0228381 | A1* | 9/2012 | Drzymala ........... | G06K 7/10712 235/440 |
| 2014/0008440 | A1 | 1/2014 | Patil | |
| 2021/0365647 | A1 | 11/2021 | Barkan et al. | |
| 2021/0374375 | A1 | 12/2021 | Gururaja et al. | |

OTHER PUBLICATIONS

Written Opinion of the ISA, United States Patent and Trademark Office, mailed Apr. 30, 2024, in connection with PCT Application No. PCT/US24/12109 (10 pages).
International Search Report, United States Patent and Trademark Office, mailed Apr. 30, 2024, in connection with PCT Application No. PCT/US24/12109 (2 pages).

* cited by examiner

Primary Examiner — Toan C Ly
(74) Attorney, Agent, or Firm — Yuri Astvatsaturov

(57) ABSTRACT

A method and system for decoding data appearing within a field of view (FOV) of an indicia reader includes providing first illumination to a first region of the FOV, the FOV further having a second region of the FOV that does not receive the first illumination. An imaging assembly captures image data of an environment within the FOV. Responsive to determining a presence of an indicia within the first region of the FOV, the method further includes at least one of (i) transmitting the image data to a decoder module, (ii) decoding the indicia by the decoder module, or (iii) generating a successful decode operation. Responsive to determining a presence of indicia within the second region of the FOV, the method includes performing at least one of (i) not transmitting the image data to the decoder module, (ii) not decoding the indicia by the decoder module, or (iii) not generating a successful decode operation.

18 Claims, 9 Drawing Sheets

METHOD TO LIMIT DECODE VOLUME

BACKGROUND

Industrial scanners and/or barcode readers may be used in consumer stores or warehouse environments and/or other environments and may be provided in the form of mobile scanning devices or stationary scanning systems. These scanners may be used to scan barcodes, packages, consumer products, and other objects. Additionally, machine vision systems are useful for performing object and indicia detection and tracking. Wide fields of view (FsOV) are becoming more desirable for scanning and machine vision systems to allow for improved machine vision tracking and performance, and for improved barcode reading using leading edge barcode detection.

Barcode scanners with wider FsOV with high resolution imaging sensors are required for efficient barcode detection and machine vision applications in many environments and scenarios. Wider FsOV present a number of challenges in performing high resolution imaging. for example, with wider FsOV, there is an increased chance of performing accidental barcode scans in regions of a FOV outside of a desired scanning region. For example, a consumer may scan an item and then place the item on a counter or bagging area that may still be in the field of view (FOV) of the imaging system. As such, items may accidentally be scanned and decoded multiple times within a FOV of a barcode scanner.

Accordingly, there is a need for improved designs having improved functionalities.

SUMMARY

In accordance with a first aspect, a method for decoding encoded data appearing within a field of view (FOV) of an indicia reader includes providing, by a first illumination assembly, first illumination to a first region of the FOV, the FOV further having a second region of the FOV that does not receive the first illumination from the first illumination assembly; capturing, by an imaging assembly associated with the FOV, image data representative of an environment appearing within the FOV; responsive to determining a presence of an indicia within the first region of the FOV, at least one of (i) transmitting the image data to a decoder module, (ii) decoding the indicia by the decoder module, or (iii) generating a successful decode operation; and responsive to determining a presence of the indicia within the second region of the FOV, at least one of (i) not transmitting the image data to the decoder module, (ii) not decoding the indicia by the decoder module, or (iii) not generating a successful decode operation.

In a variation of the current embodiment, the first illumination includes one or more of infrared light, or light with a wavelength of longer than 700 nm. The first illumination may be provided by one or more light emitting diodes, and the one or more light emitting diodes provide the first illumination.

In variations, the light may be spatially masked light and the method may include capturing, by the imaging assembly, image data of the structured light pattern; and determining, from the image data of the structured light pattern, a distance from the imaging assembly to the indicia.

In accordance with another aspect, a method for decoding encoded data appearing within a field of view (FOV) of an indicia reader includes providing, by an illumination assembly, first illumination to a first region of the FOV during a first period of time; capturing, by an imaging assembly associated with the FOV, and during the first period of time, first image data representative of an environment appearing within the FOV; providing, by the illumination assembly, second illumination to the FOV during a second period of time; capturing, by the imaging assembly, second image data during the second period of time; responsive to determining a presence of an indicia within the first region of the FOV, at least one of (i) transmitting the second image data to a decoder module, (ii) decoding the indicia by the decoder module, or (iii) generating a successful decode operation; and responsive to determining a presence of the indicia within the second region of the FOV, at least one of (i) not transmitting the second image data to the decoder module, (ii) not decoding the indicia by the decoder module, or (iii) not generating a successful decode operation.

In accordance with yet another aspect A system for decoding encoded data appearing within a field of view (FOV) of an indicia reader, the system including: an imaging assembly configured to capture images of the FOV of the indicia reader; a first illuminator configured to provide first illumination to a first region of the FOV, the FOV further having a second region of the FOV that does not receive the first illumination from the first illumination assembly; and a processor and computer-readable media storage having machine readable instructions stored thereon that, when the machine readable instructions are executed, cause the system to: provide, by the first illumination assembly, first illumination to a first region of the FOV, the FOV further having a second region of the FOV that does not receive the first illumination from the first illumination assembly; capture, by the imaging assembly, image data representative of an environment appearing within the FOV; responsive to determining a presence of an indicia within the first region of the FOV, at least one of (i) transmit the image data to a decoder module, (ii) decode the indicia by the decoder module, or (iii) generate a successful decode operation; and responsive to determining a presence of the indicia within the second region of the FOV, at least one of (i) not transmit the image data to the decoder module, (ii) not decode the indicia by the decoder module, or (iii) not generate a successful decode operation.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
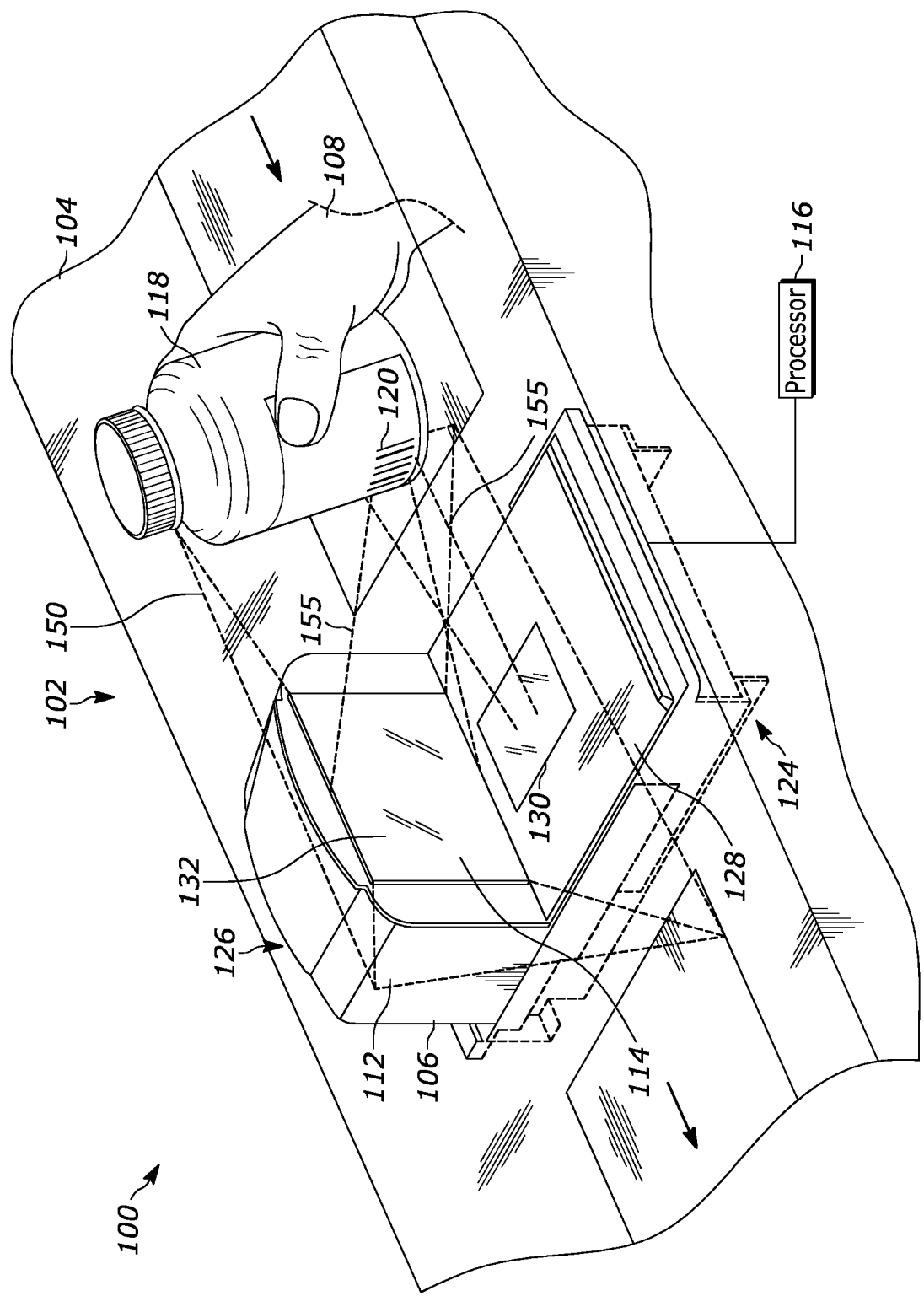
FIG. 1 illustrates a perspective view of an example checkout workstation in accordance with the teachings of this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally, pursuant to these various embodiments, a method and system for decoding indicia in a decode volume are presented. The method includes providing first illumination to a decode region within a field of view (FOV) of an imaging system. The imaging system then detects the first illumination and only detects, or only decodes, or only provides decoded information to another system if an indicia is detected to be within the decode region of the FOV.

FIG. 1 illustrates a perspective view of an example point-of-sale (POS) system 100, for reading barcodes or decoding indicia, in accordance with the teachings of this disclosure. In the example shown, the system 100 includes a workstation 102 with a counter 104 and a bi-optical (also referred to as "bi-optic") barcode reader 106. The barcode reader 106 may also be referred to as a bi-optic scanner or an indicia reader. The POS system 100 is often managed by a store employee such as a clerk 108. However, in other cases, the POS system 100 may be part of a so-called self-checkout lane where instead of a clerk, a customer is responsible for checking out his or her own products.

The barcode reader 106 includes a housing 112 that houses an optical imaging assembly 114. The optical imaging assembly 114 includes one or more image sensors and is communicatively coupled to a processor 116. The image sensors may include one or more color cameras, one or more monochrome imagers, one or more infrared cameras or sensors, one or more optical character readers, etc. The processor 116 may be disposed within the barcode reader 106 or may be in another location. The optical imaging assembly 114 includes one or more fields of view (FsOV) 150. Further, the optical imaging assembly may include decode zones 155, also referred to herein as decode volumes, being regions of space within the FsOV 150 for decoding indicia in the decode zones 155. The FsOV 150 and the decode zones 155 are described in further detail below and in connection with FIGS. 2 and 3. The optical imaging assembly 114 is operable to capture one or more images of one or more targets 118 entering and/or being within the FOV 150. The optical imaging assembly 114 may detect or image targets 118 in the FsOV 150, but may only decode or process images in a decode zone 155 of the imaging assembly, with the decode zone 155 being a sub-region of one or more FsOV 150 of the optical imaging assembly 114. While referenced herein as one or more targets 118, a target 118 may also be referred to herein as an object of interest, or in short, an object. In any embodiment or description, the target 118, or object of interest, includes one or more product codes 120 or indicia indicative of information associated with the target 118.

In practice, the targets 118, depicted as a bottle in the example shown, is swiped past the barcode reader 106. While illustrated as a single target in FIG. 1 for simplicity and clarity, it is envisioned that the bottle represents multiple targets 118 to be imaged by the optical imaging assembly 114, and that the multiple targets 118 may be within a field of view (FOV) 150 of the optical imaging system 114 simultaneously or nearly simultaneously. In doing so, one or more product codes 120 associated with the targets 118 are positioned within the FOV of the optical imaging assembly 114. In the example shown, the product code 120 is a bar code. However, the product code 120 may alternatively be a radio-frequency identification (RFID) tag and/or any other product identifying code. In examples, the target 118 may be in the FOV 150 of the optical imaging system 114 and the product code 120 may specifically be in a sub-region of the FOV 150 with the sub-region being a decode region 155 for decoding indicia of the product code 120.

In response to capturing the one or more images (e.g., image data), in an example, the processor 116 processes the image data to determine an absence, a presence, movement, etc. of the targets 118 within and/or relative to the FOV 150 and/or decode regions 155. Specifically, the processor 116 processes the image data in real time to determine when one or more of the targets 118 enters the FOV 150 or a decode region 155 of the optical imaging assembly 114, when one or more targets 118 are within the FOV 150 and/or decode regions 155 of the optical imaging assembly 114, and/or when one or more of the targets 118 exits the FOV and/or decode regions 155 of the optical imaging assembly 114. The processor may capture an image of an FOV 150 of the optical imaging assembly 114 and identify the presence of indicia, such as the product code 120, in the image. The processor 116 may then determine in the product code 120 is within a decode region 155 and may further decode and provide information to a user or another system. If the product code is within the FOV 150, but is not in a decode region 155, the processor 116 may not decode the indicia, or the processor may decode the indicia but may not further provide any decoded information to a user or another system for further processing.

In some examples, the optical imaging assembly 114 has a relatively short focal length that allows the foreground in which the one or more targets 118 may be present to be better isolated from the background, thereby allowing for the targets 118 to be more easily identified and/or tracked within the FOV 150 and/or decode regions 155. In some examples, processing the one or more images allows the processor 116 to identify an object that is moving in the FOV 150 and decode regions 155 and to identify an object that is not moving in the FOV 150 r decode regions 155. The processing may also allow the processor 116 to differentiate between a larger item(s) and a smaller item(s), a direction that the targets 118 are moving within the FOV 150 and decode regions 155, etc.

In an example, when one or more of the targets 118 are detected entering or being within the FOV 150 or decode regions 155, the processor 116 initiates an identification session during which one or more product codes 120 carried by the targets 118 can be read/identified. The one or more product codes 120 may be decoded if they are imaged in, or pass through, one of the decode regions 155 within the FOV 150. The identification session may be defined as a sequence of activation events such as the activation of the optical imaging assembly 114 as described herein. In some examples, the processor 116 compares the one or more images captured by the optical imaging assembly 114 to preceding ones of the one or more images to detect one or more of the targets 118 entering the FOV 150 or being in the FOV 150, or entering or being in a decode region 155.

The processor 116 may be configured to identify the one or more targets 118 based on at least a size of the targets 118, a color of the targets 118, a shape of the targets 118, a feature of the targets 118, a logo displayed on the targets 118, etc. In some examples, identifying the product code 120 includes successfully decoding symbology associated with the targets 118. However, if the targets 118 are detected exiting the FOV 150, or decode regions 155, and/or entering and exiting the FOV 150 or decode regions 155 without the product code 120 being identified, the processor 116 may generate an alert indicative of the targets 118 not being scanned. Such an approach may be advantageous in detecting an individual (e.g., the clerk 108) attempting to avoid scanning the targets 118, which may be referred to as the act of "scan avoidance."

After the processor 116 terminates the identification session, in an example, the processor 116 prevents a subsequent identification session from being initiated until one or more targets 118 are detected existing the FOV 150 and/or decode regions 155 of the optical imaging assembly 114. To allow the processor 116 to track the position and/or the movement of the targets 118 within the FOV and/or to identify the targets 118 within the FOV, in some examples, the processor 116 determines a background region 127 (the background region 127 is more clearly shown in FIGS. 5A, 5B, 5C, and 5D) that does not contain any objects or product codes 120. The processor may then remove the background region 127 or otherwise filter the background region 127 from image data and may prevent the background region from displaying any image on a user display. As such, the processor 116 may further control the decode regions 155 or digitally filter the FOV 150 of the optical imaging assembly 114 to a three-dimensional space including the entirety of the FOV 150 of the optical imaging assembly 114, or to a reduced three-dimensional, or two-dimensional volume, being a subset of space within the FOV 150 of the optical imaging assembly 114.

The housing 112 includes a lower housing 124 and a raised housing 126. The lower housing 124 may be referred to as a first housing portion and the raised housing 126 may be referred to as a tower or a second housing portion. The lower housing 124 includes a top portion 128 with a first optically transmissive window 130. The first window 130 is positioned within the top portion 128 along a generally horizontal plane relative to the overall configuration and placement of the barcode reader 106. In some embodiments, the top portion 128 may include a removable or a non-removable platter (e.g., a weighing platter). The top portion 128 can also be viewed as being positioned substantially parallel with the counter 104 surface. As set forth herein, the phrase "substantially parallel" means+/−10° of parallel and/or accounts for manufacturing tolerances. It's worth noting that while, in FIG. 1, the counter 104 and the top portion 128 are illustrated as being about co-planar, that does not have to be the case for the platter and the counter 104 to be considered substantially parallel. In some instances, the counter 104 may be raised or lowered relative to the top surface of the top portion 128, where the top portion 128 is still viewed as being positioned substantially parallel with the counter 104 surface. The raised housing 126 is configured to extend above the top portion 128 and includes a second optically transmissive window 132 positioned in a generally upright plane relative to the top portion 128 and/or the first window 130. Note that references to "upright" include, but are not limited to, vertical. Thus, as an example, something that is upright may deviate from a vertical axis/plane by as much as 45 degrees.

The optical imaging assembly 114 includes the image sensor(s) that is configured to digitally read the product code 120 through at least one of the first and second windows 130, 132 to detect and decode indicia at various positions and orientations within the FsOV 150 of the imaging assembly 114. The FOV 150 illustrated includes four sub-FOVs, a first sub-FOV 134 (the first sub-FOV 134 is more clearly shown in FIG. 2), a second sub-FOV 136 (the second sub-FOV 136 is more clearly shown in FIG. 2), a third sub field of view 138 (the third sub-FOV 138 is more clearly shown in FIG. 3), and a fourth sub field of view 140 (the fourth sub-FOV 140 is more clearly shown in FIG. 3). In an example, identifying the position of the target 118 through the first and second windows 130, 132 using the optical imaging assembly 114 allows for a virtual three-dimensional (3D) image of the swipe path of the target 118 through the FOV 150 to be identified. The swipe path may include a diagonal swipe path. In addition to monitoring the swipe path, the processor 116 may process the one or more images captured by the optical imaging assembly 114 to track behavior of the clerk 108 including, for example, how the target 118 is held, the swipe direction most followed, etc. Further, the swipe path may be monitored to determine if a given target 118 has already been scanned and/or identified to prevent a re-decoding of a previously decoded product code 120. While the above-example illustrates tracking a single target 118, in other examples, more than one target swipe path may be tracked.

Figure 2:
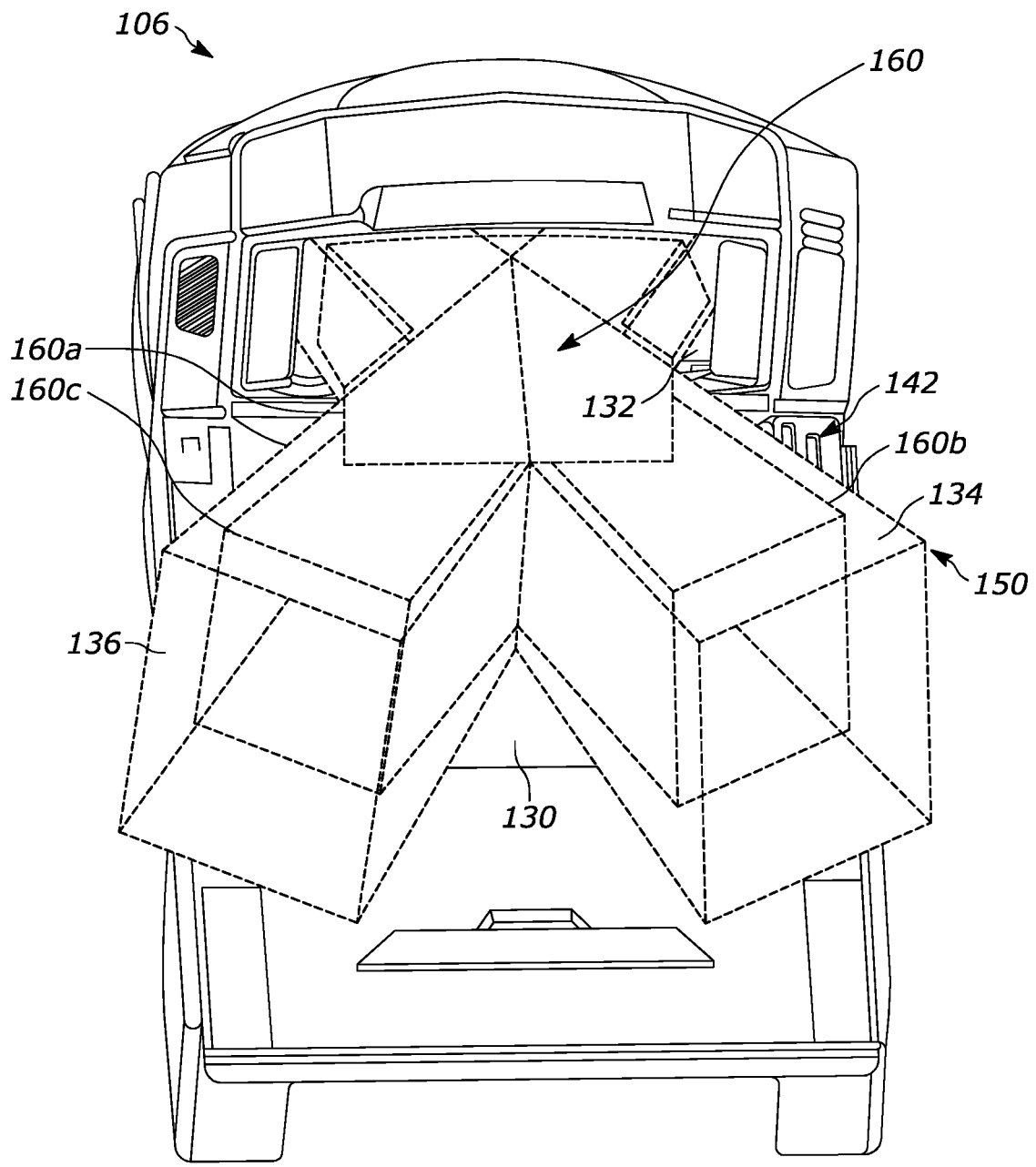
FIG. 2 illustrates example first and second sub-fields of view projecting from a generally vertical window of the barcode reader of FIG. 1.

FIG. 2 illustrates the first and second sub-FsOV 134, 136 projecting from the second window 132 of another example of the barcode reader 106 of FIG. 1. In the currently described embodiment, fold mirrors (not shown) that are carried by the barcode reader 106 are positioned such that the first sub-FOV 134 and the second sub-FOV 136 intersect above the first window 130 and in a product-scanning region 142 of the barcode reader 106. The product-scanning region 142 is the general area where the target 118 is expected to be presented for image capture by the barcode reader 106. In some cases, the fold mirrors can be arranged to cause the first sub-FOV 134 and the second sub-FOV 136 to intersect partially. In other instances, the fold mirrors can be arranged to cause the first sub-FOV 134 and the second sub-FOV 136 to intersect fully. In still other instances, the fold mirrors can be arranged to cause a centroidal axis of each of the first sub-FOV 134 and the second sub-FOV 136 to intersect with or without regard for the cross-sectional dimensions of the FsOV. The first and second sub-FsOV 134 and 136 contain a first decode region 160 (indicated by the dot-dash lines in FIG. 2). The first decode region 160 may include an near region 160a that includes areas close to the first window 130 and regions of space where the first and second sub-FsOV overlap. The first decode region 160 may further include first and second sub-decode regions 160b and 160b that extend further from the first window 132, where the first FOV 134 does not overlap with the second sub-FOV 136.

Figure 3:
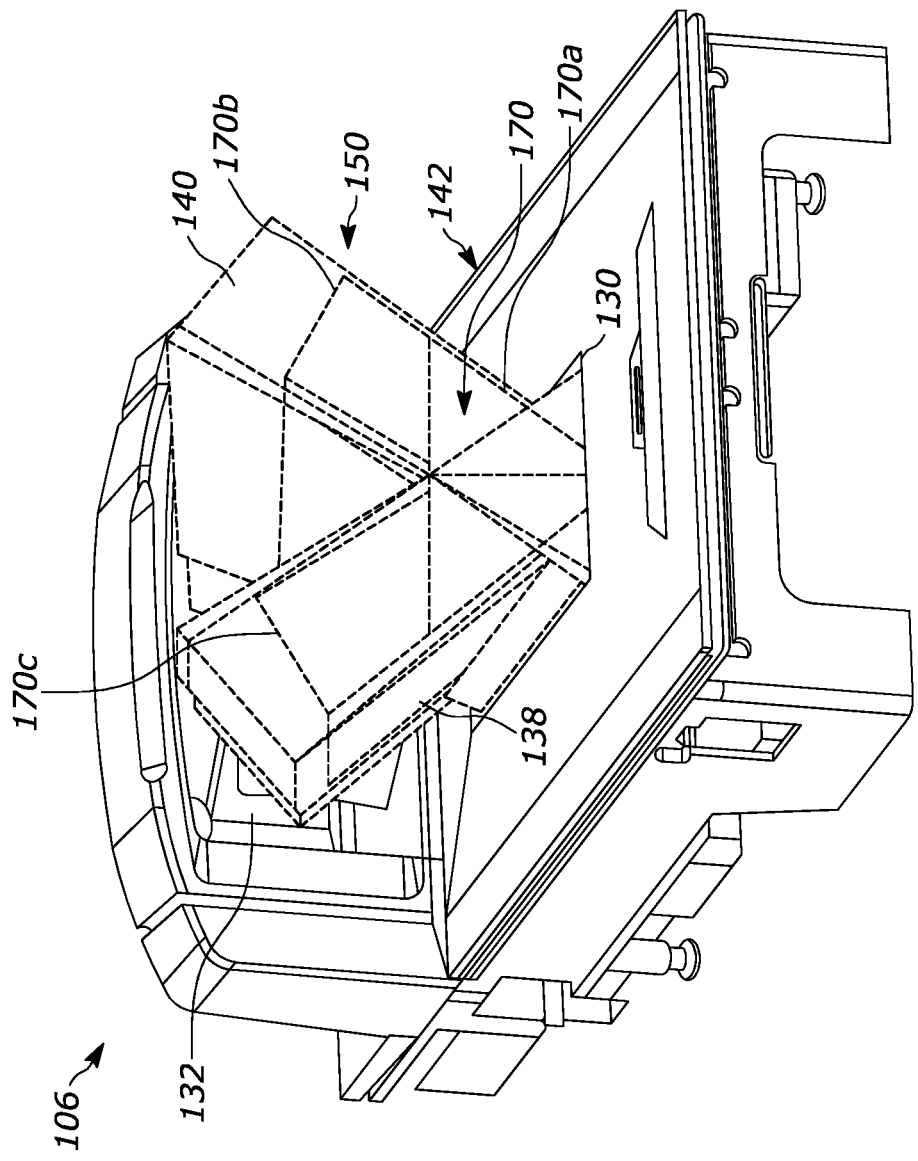
FIG. 3 illustrates example third and fourth sub-fields of view projecting from a generally horizontal window of the barcode reader of FIG. 1.

FIG. 3 illustrates the third and fourth sub FsOV 138, 140 projecting from the first window 130 of the barcode reader 106 of FIG. 2. In the currently described embodiment, the fold mirrors are positioned such that the third sub-FOV 138 and the fourth sub-FOV 140 intersect in front of the second window 132 and in the product-scanning region 142 of the barcode reader 200. The overlap of the and fourth sub-FsOV 128 and 140 may define a second decode region 170. In some cases, the fold mirrors can be arranged to cause the third sub-FOV 138 and the fourth sub-FOV 140 to intersect partially. In other instances, the fold mirrors can be arranged to cause the third sub-FOV 138 and the fourth sub-FOV 140 to intersect fully. In still other instances, the fold mirrors can be arranged to cause a centroidal axis of each of the third sub-FOV 138 and the fourth sub-FOV 140 to intersect with or without regard for the cross-sectional dimensions of the FsOV. The first and second sub-FsOV 134 and 136 contain the second decode region 170 (indicated by the dot-dash lines in FIG. 3). The second decode region 170 may include a near region 170a that includes areas close to the second window 130 and the region of space where the first and second sub-FsOV 138 and 140 overlap. The second decode region 170 may further include third and fourth sub-decode regions 170b and 170c that extend further from the second window 130, where the third FOV 138 does not overlap with the fourth sub-FOV 140.

While the imaging assembly is capable of imaging the entire FOV, the imaging assembly may only decode indicia imaged in one or more of the decode regions (i.e., the first decode region 160 and second decode region 170). As such, indicia may be present within a FOV of the optical imaging assembly 114, and the processor may not decode the indicia if the indicia is not within one of the first and/or second decode regions 160 and 170. Further, the processor may decode information associated with an indicia in the indicia is imaged within an FOV of the optical imaging assembly 114, but the processor 116 may not provide the decode information to a user or another system if the indicia is not within one or more of the first and second decode regions 160 and 170. Limiting the decode volume to a sub-region of the FOV of the optical imaging assembly 114 prevents repeat decodes, or accidental decodes of indicia that are not to be scanned or decoded, but may still reside within the FOV of the assembly 114. For example, a user may scan an item by passing indicia through the a decode region 160 or 170, and the user may then place the object on a nearby counter within the FOV of the optical imaging assembly 114. The optical imaging assembly may continue to image the indicia of the target but the assembly 114 will not further decode, or provide decoded information to another system, because the target has been moved out of the decode regions 160 and/or 170.

Figure 4:
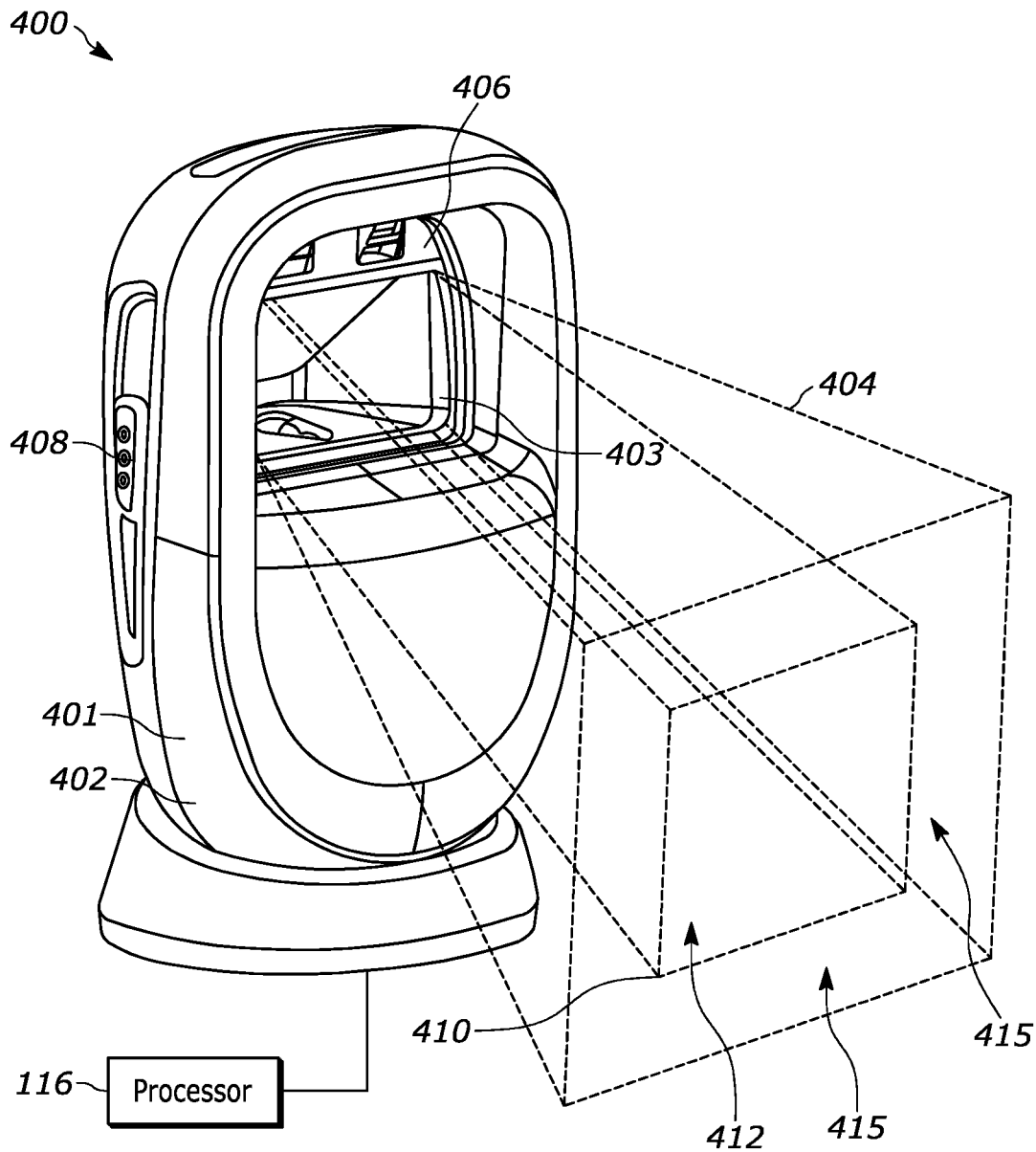
FIG. 4 illustrates an example scanner in accordance with the teachings of this disclosure.

FIG. 4 illustrates a perspective view of another example scanning device 400 in accordance with the teachings of this disclosure. The scanning device 400 may be referred to as an indicia reader, and the scanning device may be handheld to move around a target to scan indicia or the scanning device 400 may be stationary, for example, free standing on a countertop. In the example shown, the scanning device 400 includes a housing 401 having a handle or a lower housing portion 402 and an optical imaging assembly 403. The optical imaging assembly 403 is at least partially positioned within the housing 401 and has a FOV 404. The scanning device 400 also includes an optically transmissive window 406 and a trigger 408. The optical imaging assembly 403 may include one or more image sensors that may include a plurality of photo-sensitive elements (e.g., visible photodetectors, infrared photodetectors or cameras, a color sensor or camera, etc.). The photo-sensitive elements may be arranged in a pattern and may form a substantially flat surface. For example, the photo-sensitive elements may be arranged in a grid or a series of arrays forming a 2D surface. The image sensor(s) of the optical imaging assembly 403 may have an imaging axis that extends through the window 406.

To operate the scanning device 400, a user may engage the trigger 408 causing the scanning device 400 to capture an image of a target, a product code, or another object. Alternatively, in some examples, the scanning device 400 may be activated in a presentation mode to capture an image of the target, the barcode, or the other object. In presentation mode, the processor 116 is configured to process the one or more images captured by the optical imaging assembly 403 to identify a presence of a target, initiate an identification session in response to the target being identified, and terminate the identification session in response to a lack of targets in the FOV 404.

The scanning device 400 also has a decode region 410 that is a sub-region of the FOV 404. The decode region 410 may be referred to as a first region 412 of the FOV 404, with a second region 415 of the FOV being the region of the FOV 404 that is not included in the first region 412. The scanning device 400 may image a target in the first region 412 and the scanning device identifies and decodes indicia imaged in the first region 412. The scanning device 400 also may further process decoded information of the indicia and provide information associated with the indicia to a user (e.g., via a user interface, monitor, tablet computer, handheld device, etc.) if the indicia is imaged within the first region 412. If the indicia is imaged in the second region 415 the processor may not decode the indicia, as the second region 415 is outside of the decode region 410. In examples where the indicia is imaged in the second region 415, the processor may decode information associated with the indicia, but may not further provide the information to a user or another system for further processing.

Figure 5:
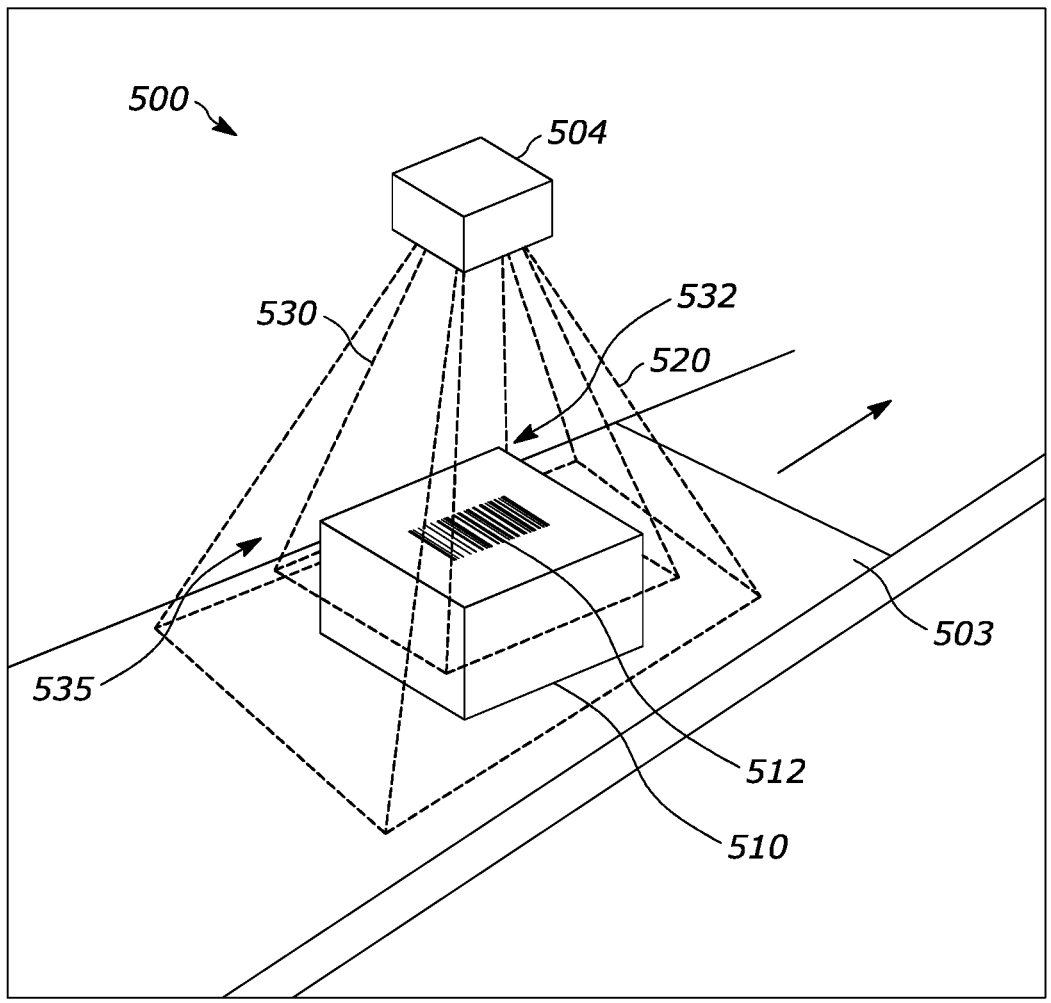
FIG. 5 illustrates an example environment for performing machine vision scanning of an object.

FIG. 5 illustrates an example environment 500 for performing machine vision scanning of an object. In the environment 500 of FIG. 5 a machine vision device 504, which may be a barcode reader or imager such as the scanning device 400 of FIG. 4, is position above a scanning surface 503. The machine vision device 504 may be placed on a counter next to the scanning surface 503 to image one or more objects of interest 510 on the scanning surface 503. The machine vision device 504 is disposed and oriented such that a FOV 520 of the machine vision device 504 includes a portion of the scanning surface 503. Further, the machine vision device 504 has a decode region 530, being a first region 532 as a sub-region of the FOV 520, and a second region 535 of the FOV 520. The second region is the region of the FOV 520 that does not include the first region 532. The scanning surface 503 may be a table, podium, mount for mounting an object or part, a conveyer, a cubby hole, or another mount or surface that may support a part or object to be scanned. As illustrated, the scanning surface 503 is a conveyer belt having the object of interest 510 thereon. The object of interested 510 is illustrated as being within the FOV 520 of the machine vision device 50. The object of interest 510 contains an indicia 512 thereon with the indicia 512 disposed in the first region 532 of the FOV 520. The machine vision device 504 captures one or more images of the object of interest 510 and decodes the indicia 512 if the indicia is in the first region 532 of the FOV 520. As the object of interest 510 moves through the FOV 520, the indicia 512 moves into the second region 535. The machine vision device 504 does not decode, or provide decoded information to another system, when the indicia is imaged in the second region 535.

As illustrated, the indicia 512 is a barcode, but the indicia 512 may individually include one or more of 1D barcode, 2D barcode, QR code, static barcode, dynamic barcode, alphabetical character, text, numerals, alphanumeric, other characters, a picture, vehicle identification number, expiration date, tire identification number, or another indicia having characters and/or numerals. In examples, the object of interest 510 may have more than one indicia, and the machine vision device 504 may capture an image of the FOV 520 and decode one or more indicia in the first region 532, while not decoding indicia in the second region 535.

The machine vision device 504 may be mounted above the object of interest 510 on a ceiling, a beam, a metal tripod, or another object for supporting the position of the machine vision device 504 for capturing images of the scanning bed 503. Further, the machine vision device 504 may alternatively be mounted on a wall or another mount that faces objects on the scanning bed 503 from a horizontal direction. In examples, the machine vision device 504 may be mounted on any apparatus or surface for imaging and scanning objects of interest that are in, or pass through, the FOV 520 of the machine vision device 504. The described method and system may be implemented for decoding indicia, or identifying text, numerals, or characters in any orientation, and any arrangement.

Figure 6:
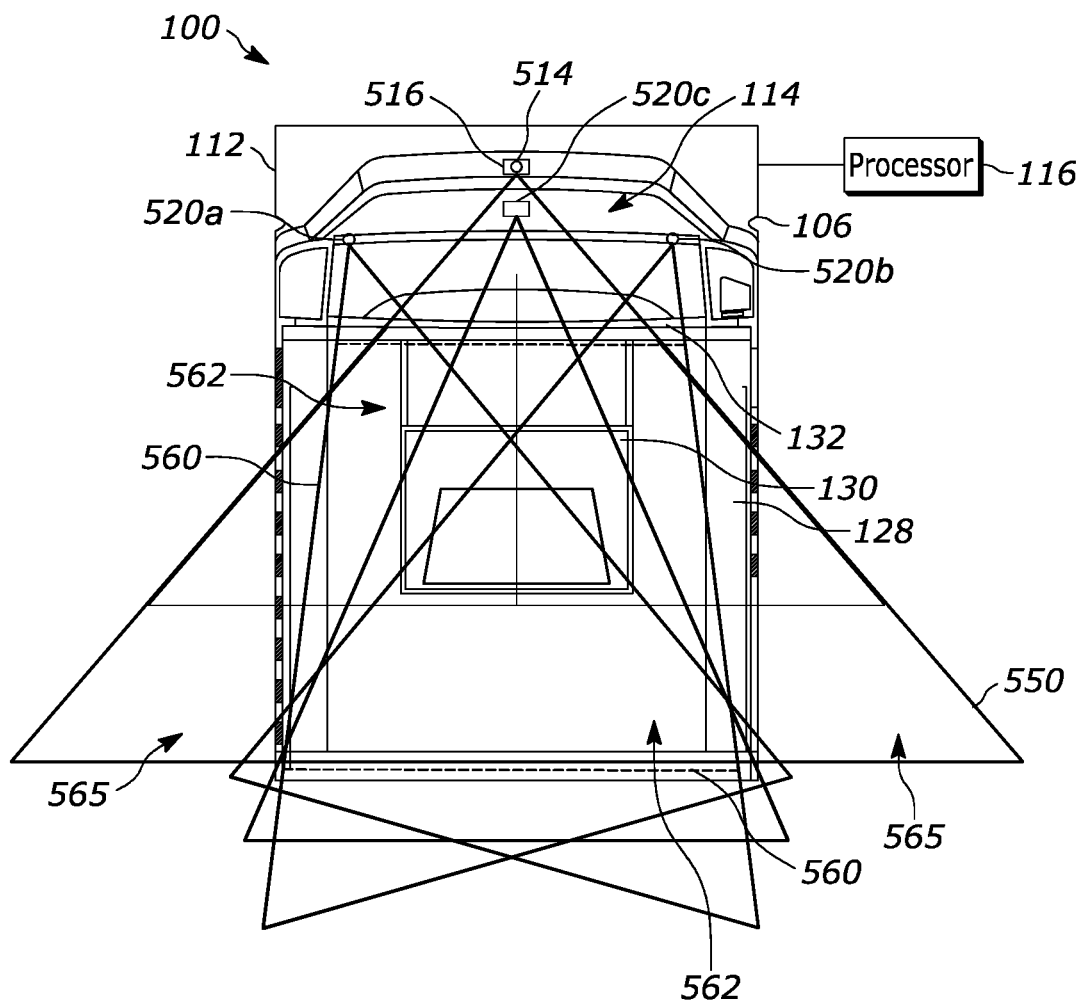
FIG. 6 illustrates a top-down view of the checkout workstation of FIGS. 1-3 for reading barcodes of indicia.

FIG. 6 illustrates a top-down view of the POS system 100 of FIGS. 1-3 for reading barcodes of indicia. The imaging assembly 114 has one or more image sensors 514 disposed to image a FOV 520 of the imaging assembly 114. The FOV 550 is a wide FOV that may capture images of objects not disposed on or near the first or second windows 132 and 130. The imaging assembly 114 and associated image sensors capture images of the FOV 550 and provide image data representative of an environment appearing in the FOV 550 to a processor for further image processing and indicia decoding, or for machine vision processes. The image sensors 514 may include one or more cameras, infrared sensors, color sensors, white light sensors, CCDs, sensor pixel arrays, etc.

The POS system 100 further includes one or more first illuminators 522a-522c. The first illuminators 522a-522c are configured to provide illumination to a decode region 560 of the FOV 550. The decode region 560 is a first region 562 of the FOV 550 inside of which, the POS system 100 will decode indicia imaged in the first region 562. The FOV 550 further includes one or more second regions 565 inside of which, the POS system 100 will not decode indicia imaged in the second region 565. The one or more first illuminators 522a-522c may include one or more light emitting diodes (LEDs), infrared light sources, visible light sources, white light sources, or spatially masked light sources. The first illuminators 522a-522c may provide light having a wavelength of greater than 500 nm, greater than 700 nm, greater than 750 nm, greater than 800 nm, or greater than 900 nm. As illustrated, the one or more first illuminators 522a-522c may provide illumination that overlaps in the FOV 550 of the POS system 100, and the first illuminators 522a-522c do not provide illumination to any of the second regions 565.

In examples, the first illuminators 522a-522c may all provide the first illumination, or two of the illuminators, such as the left first illuminator 522a and right first illuminator 522c may each provide the first illumination to the first region 562. The left and right first illuminators 522a and 522c may be positioned at opposite sides or edges of a scanner window such as the second transmissive window 132. The left and right first illuminators 522a and 522c may be spatially masked using a custom mask or aperture to limit the first radiation to the first region 562. Additionally, the left and right first illuminators 522a and 522c may be further masked or attenuated to limit the distance of the first illumination to a distance from the second transmissive window 132, to control a three-dimensional volume of the FOV 550, and specifically of the first region 562.

The first illuminators 522a-522c may be positioned anywhere behind the second transmissive window 132, in front of the second transmissive window 132, or adjacent to the second transmissive window 132 to provide the first radiation to the first region 562. Additionally, while three first illuminators 522a-522c are illustrated, less first illuminators, or more first illuminators may be used to provide the first illumination to the first region 562. In examples, the first illuminators 522a-522c may be positioned and oriented to provide the first radiation to have an illumination field width of within ±10% of the width of the lower housing 124, or more specifically, of within ±10% of the width of the top portion 128 of the lower housing 124.

The imaging assembly may further include one or more second illuminators 516 that provide illumination approximately across the entire FOV 550. While illustrated as proximal to the imaging sensors 514, the POS system 100 may include a plurality of second illuminators 516 disposed at various locations to provide illumination to the FOV 550. In examples, the second illuminators 516 provide illumination to at least portions of the first and second regions 562 and 656, and may provide radiation to all of the first and second regions 562 and 565. The second illuminators 516 may include white light sources, color light sources, wavelength filtered light sources, monochromatic light sources, light sources having wavelengths in the visible spectrum, or infrared light sources.

In examples, the first and second illuminators 522a-522c, and 516 may provide radiation that overlaps in wavelength band. For example, the first illuminators 522a-522c may provide radiation that spans the infrared spectrum from 700 nm to 900 nm, and the second illuminators 516 may provide illumination in the visible spectrum from 300 nm to 750 nm. Additionally, the first and second illuminators 522a-522c, and 516 may provide illumination that shares an entire bandwidth of wavelengths, for example, the first and second illuminators 522a-522c, and 516 may both provide white light and the first and second illumination. As such, the first and second illumination may be provided at different times, and the imaging assembly may capture a first image at a first time while the first radiation is provided, and may capture a second image during a second time while the second illumination is provided. The system may then process the first and second images and determine, from the first and second images, if an indicia is present in the first region 562, or if indicia is not present in the first region 562.

In addition to receiving image data and processing image data to identify and decode indicia, the processor 116 may control various components of the POS system 100. For example, the processor 116 may control the one or more first illuminators 522a-522c and second illuminators 516 to control, for each first illuminator 522a-522c and/or second illuminator 516, an on-time or off-time of the illuminator, an output power or brightness, an output illumination color (e.g., white, blue, red), output wavelength band (e.g., infrared, etc.), etc. The processor 116 may control the one or more image sensors 514, or cameras, to command the image sensors 514 to capture image data, or to control various imaging properties such as resolution, exposure time, gain value, etc.

Figure 7:
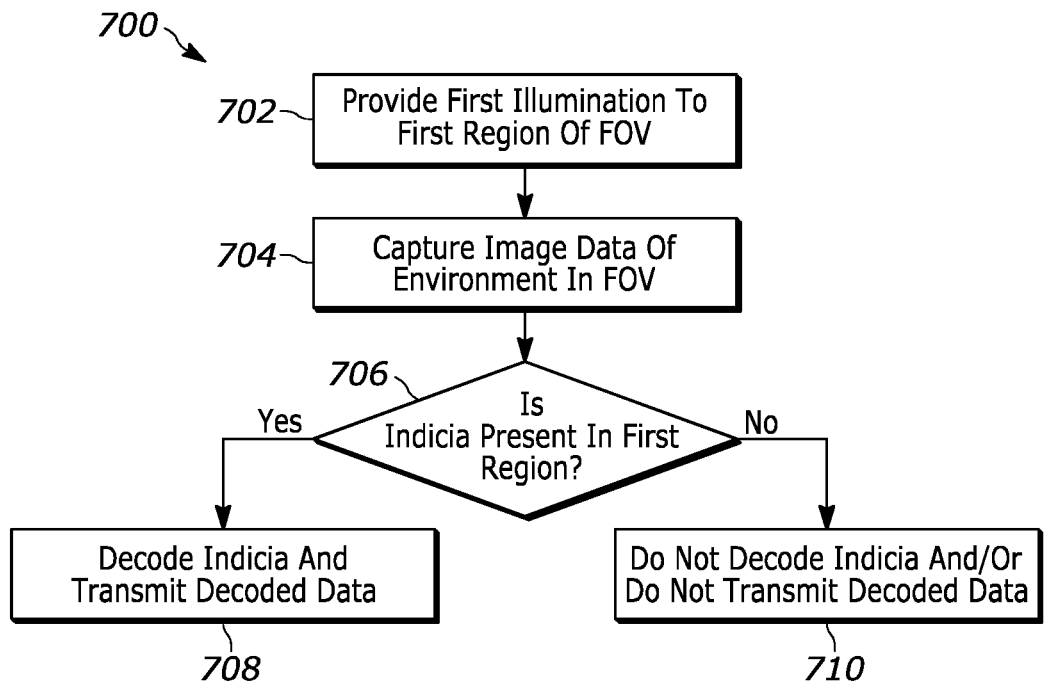
FIG. 7 illustrates a flowchart for performing a method for decoding encoded data appearing within a field of view (FOV) of an indicia reader.

FIG. 7 illustrates a flowchart for performing a method for decoding encoded data appearing within a FOV of an indicia reader. The method may be performed by any of the imaging system 100 of FIGS. 1-3 and FIG. 6, barcode reader 200 of FIG. 2, and machine vision device 504 of FIG. 5. A process 700 begins at block 702 with providing first illumination to a first region of the FOV, the first region being a decode region of the FOV. The FOV further has a second region that does not receive the first illumination from the first illumination assembly. The first illumination assembly may include one or more first illuminators to provide the first illumination. In examples, the first illumination may include one or more of infrared light, white light, a color light, light having a wavelength of longer than 700 nm, light having a wavelength of longer than 750 nm, or light having a wavelength of longer than 900 nm. The one or more first illuminators may include one or more LEDs, white light sources, infrared light sources, color light sources, etc.

At block 704 an imaging assembly captures image data representative of an environment appearing within the FOV. The imaging assembly may include one or more visible light cameras or sensors, infrared cameras or sensors, color cameras, or another camera or sensor for capturing image data. A processor then may analyze the image data to determine the position of indicia in the image. The processor may determine, from the image data, the presence of indicia in the first region of the FOV. (block 706). In response to determining the presence of indicia within the first region of the FOV, the imaging system further continues to perform at least one of (i) transmit the image data to a decoder module, (ii) decode the indicia by the decoder module, or (iii) generate a successful decode operation. (block 708). To successfully generate a decode operation, the indicia reader may provide a noise alert confirmation such as a beep or tone, provide a visual confirmation of a successful decode or scan, or provide another indication of the successful scan. The processor may determine the presence of indicia in the second region of the FOV. In responsive to determining the presence of the indicia in the second region of the FOV, the system further continues to at least one of (i) not transmit the image data to the decoder module, (ii) not decode the indicia by the decoder module, or (iii) not generate a successful decode operation. (block 710). The method effectively reduces the decode region, or decode volume of an imaging system to a sub-region or sub-volume within a broader FOV of the imaging system to prevent unintentional decoding of indicia outside of the first region of the FOV.

The first illumination may be spatially masked illumination such as by using an aperture, a spatial light modulator, a phase mask, a grating, etc. Further, the first illumination may be a structured light pattern. The structured light pattern is a predetermined known pattern applied to the first illumination such that the pattern can be imaged and depth information can be determined from the imaged structured light pattern. Therefore, the methods described herein may further determine three-dimensional positions of the first region and a target or indicia. As such, the methods described herein may determined three-dimensional decode volume regions in space. The methods may include determining a distance from the imaging assembly to indicia using a structure light pattern, or other technique for determining distance information. The imaging assembly may further adjust a lens focus of an imager, such as a lens of a camera, based on the determined distance of the indicia, or an object, from the imaging assembly. Further, the imaging assembly may determine one or more dimensions of a target from the imaged structured light pattern. For example, the imaging assembly, or a processor in communication with the imaging assembly, may determine a shape of a target (e.g., square, rectangle, sphere, asymmetric shape, etc.) and may determine a length of a side of the target, an angle of curvature of the target, a depth of the target, a width of the target, etc.

Figure 8:
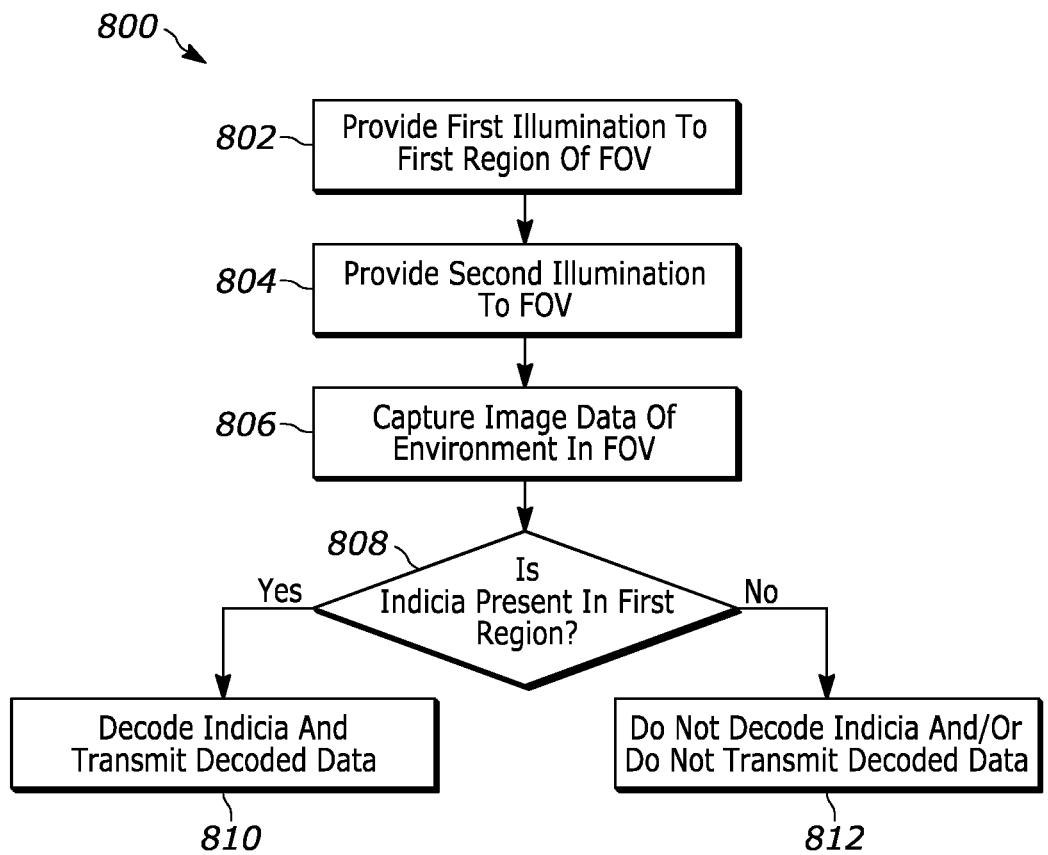
FIG. 8 illustrates a flowchart for performing a method for decoding encoded data appearing within a FOV of an indicia reader with providing both first and second illumination.

FIG. 8 illustrates a flowchart for performing a method for decoding encoded data appearing within a FOV of an indicia reader with providing both first and second illumination. The method may be performed by any of the imaging system 100 of FIGS. 1-3 and FIG. 6, barcode reader 200 of FIG. 2, and machine vision device 504 of FIG. 5. A process 800 begins at block 802 with providing first illumination to a first region of the FOV, the first region being a decode region of the FOV. The FOV further has a second region that does not receive the first illumination from the first illumination assembly. The first illumination assembly includes one or more first illuminators to provide the first illumination. In examples, the first illumination may include one or more of infrared light, white light, a color light, light having a wavelength of longer than 700 nm, light having a wavelength of longer than 750 nm, or light having a wavelength of longer than 900 nm. The one or more first illuminators may include one or more LEDs, white light sources, infrared light sources, color light sources, etc.

At block 804 the process includes providing second illumination to the FOV. The second illumination may be provided by one or more light sources of the first illumination assembly, or the second illumination may be provided by a second illumination assembly or source. The second illumination is provided to both the first region and at least a portion of the second region. The second illumination provides illumination to capture at least one image of a target within the FOV. The second illumination may be provided by one or more LEDs, black body radiation sources, or by ambient light in an environment. The second illumination may be white light, visible spectrum light, monochromatic light, color light, light with a wavelength of shorter than 900 nm, shorter than 750 nm, or shorter than 700 nm. The second illumination may be provided by a light source with a wavelength filter to provide second illumination having a desired wavelength band.

An imaging assembly captures image data representative of an environment appearing within the FOV while both the first and second illumination are provided to the first region and FOV respectively. (block 806). The imaging assembly may include one or more visible light cameras or sensors, infrared cameras or sensors, color cameras, or another camera or sensor for capturing image data. A processor then may analyze the image data to determine the position of indicia in the image. For example, the processor may determine that the indicia is within the first region based on the presence of overlap of the first illumination with the target or an indicia of the target. In a specific example, the first illumination is infrared illumination, and the second illumination is white light. The processor may determine the position of the indicia relative to the first region using the second illumination to image the target and an associated indicia, and determining the position of the first region from the infrared light in the captured image. In another example, the second illumination may be white light, and the first illumination may be visible light of a specific color or filtered band of wavelengths. For example, as white light the second illumination may illuminate a target to for imaging the target, and the first illumination may be red, blue, green, or another color band of light for the processor to be able to identify the first region in an image.

The processor then determines, from the image data, if indicia is present in the first region of the FOV. (block 808). In response to determining the presence of indicia within the first region of the FOV, the imaging system further continues to perform at least one of (i) transmit the image data to a decoder module, (ii) decode the indicia by the decoder module, or (iii) generate a successful decode operation. (block 810). The processor may determine the presence of indicia in the second region of the FOV. In responsive to determining the presence of the indicia in the second region of the FOV, the system further continues to at least one of (i) not transmit the image data to the decoder module, (ii) not decode the indicia by the decoder module, or (iii) not generate a successful decode operation. (block 812).

Figure 9:
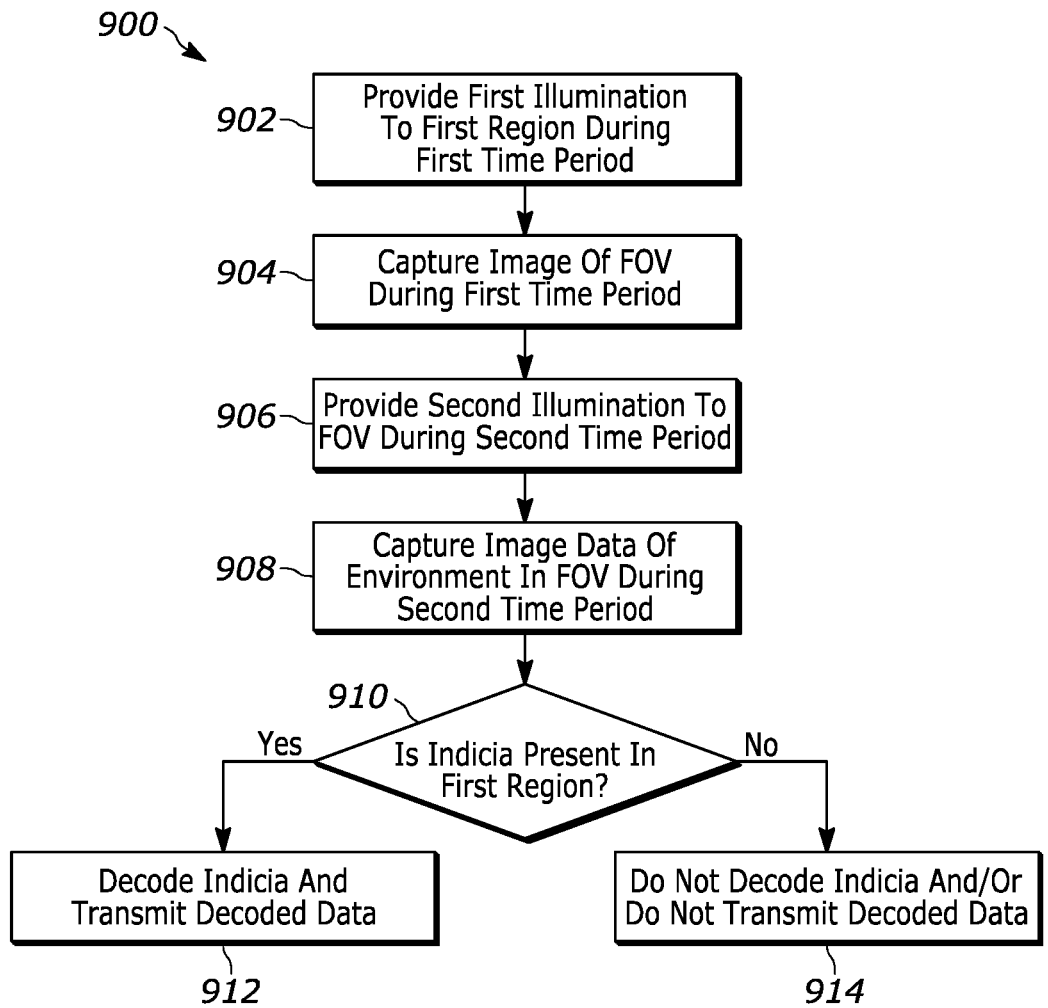
FIG. 9 illustrates a flowchart for performing a method for decoding encoded data appearing within a FOV of an indicia reader with providing interlaced first and second illumination.

FIG. 9 illustrates a flowchart for performing a method for decoding encoded data appearing within a FOV of an indicia reader with providing interlaced first and second illumination. The method may be performed by any of the imaging system 100 of FIGS. 1-3 and FIG. 6, barcode reader 200 of FIG. 2, and machine vision device 504 of FIG. 5. A process 900 begins at block 902 with providing first illumination to a first region of the FOV during a first period of time, the first region being a decode region of the FOV. The FOV further has a second region that does not receive the first illumination from the first illumination assembly. An imaging assembly captures image data representative of an environment appearing within the FOV during the first period of time while the first illumination is provided to the first region. (block 904). The imaging assembly may include one or more visible light cameras or sensors, infrared cameras or sensors, color cameras, or another camera or sensor for capturing image data. Second illumination is then provided to the FOV during a second period of time with the second period of time being different than the first period of time. (block 906). The second illumination may be provided by one or more light sources of the first illumination assembly, or the second illumination may be provided by a second illumination assembly or source. The second illumination may be provided by one or more LEDs, black body radiation sources, or by ambient light in an environment. The second illumination may be white light, visible spectrum light, monochromatic light, color light, light with a wavelength of shorter than 900 nm, shorter than 750 nm, or shorter than 700 nm. The second illumination may be provided by a light source with a wavelength filter to provide second illumination having a desired wavelength band. The second illumination is provided to at least a portion, if not all of, the first and second regions. The imaging assembly then captures second image data representative of the environment appearing within the FOV during the second time period. (block 908).

A processor then may analyze the image data to determine the position of indicia in the first and/or second image and if the indicia is in the first region. (block 910). For example, the processor may determine the first region from the first image, and then determine a location of the indicia in the second image, and then determine if the indicia is in the first region by comparing the determined first region of the first image with the position of the indicia in the second image. Further, the processor may determine the first region from the first image and perform image mapping or merging to merge the first and second images to further identify if the indicia is in the first region.

In response to determining the presence of indicia within the first region of the FOV, the imaging system further continues to perform at least one of (i) transmit the image data to a decoder module, (ii) decode the indicia by the decoder module, or (iii) generate a successful decode operation. (block 912). The processor may determine the presence of indicia in the second region of the FOV. In responsive to determining the presence of the indicia in the second region of the FOV, the system further continues to at least one of (i) not transmit the image data to the decoder module, (ii) not decode the indicia by the decoder module, or (iii) not generate a successful decode operation. (block 914).

Figure 10:
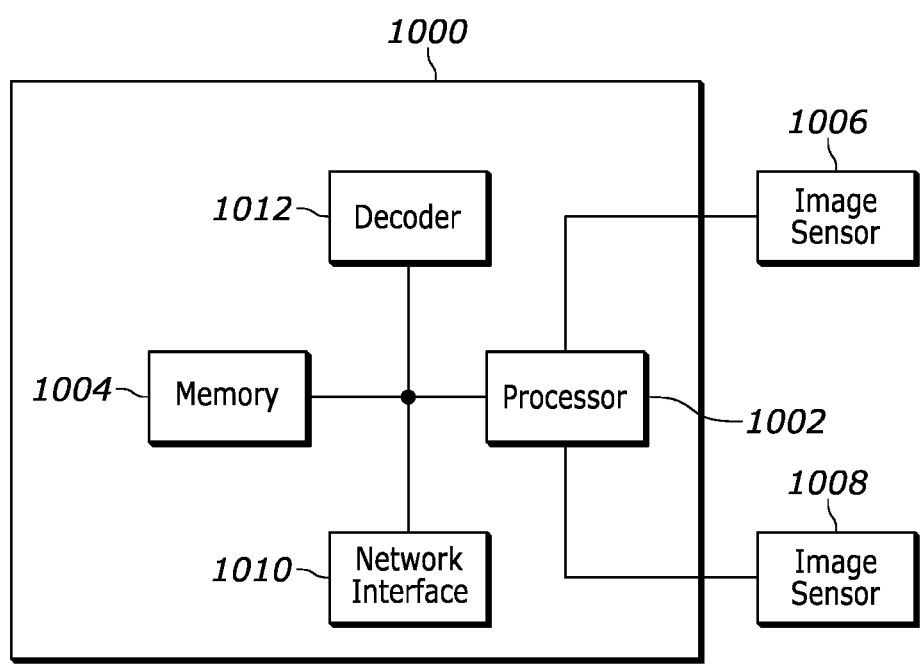
FIG. 10 is a block diagram representative of an example processor platform capable of implementing, for example, one or more components of the example systems for decoding encoded data appearing in a FOV of an imaging system or indicia reader.

FIG. 10 is a block diagram representative of an example processor platform 1000 capable of implementing, for example, one or more components of the example systems for decoding encoded data appearing in a FOV of an imaging system or indicia reader. The processor platform 1000 includes a processor 1002 and memory 1004. In the example shown, the processor is coupled to a first image sensor 1006 and a second image sensor 1008. The processor platform 1000 and/or one or more of the image sensors 1006, 1008 may be used to implement the system 100 of FIG. 1 and/or the scanning device 400 of FIG. 4. The processor platform 1000 further includes a decoder 1012 that decodes information associated with indicia. While illustrated as a separate component, the processor 1002 may also perform as a decoder 1012 to reduce the elements of the processing platform 1000.

The memory capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The memory (e.g., volatile memory, non-volatile memory) 704 accessible by the processor 702 (e.g., via a memory controller). The example processor 702 interacts with the memory 704 to obtain, for example, machine-readable instructions stored in the memory 704 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the processing platform 700 to provide access to the machine-readable instructions stored thereon.

The example processing platform 700 of FIG. 7 also includes a network interface 710 to enable communication with other machines via, for example, one or more networks. The example network interface 710 includes any suitable type of communication interface(s) (e.g., wired and/or wireless interfaces) configured to operate in accordance with any suitable protocol(s).

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions.

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

We claim:

1. A method for decoding encoded data appearing within a field of view (FOV) of an indicia reader, the method comprising:
   providing, by a first illumination assembly, first illumination to a first region of the FOV, the FOV further having a second region of the FOV that does not receive the first illumination from the first illumination assembly;
   capturing, by an imaging assembly associated with the FOV, image data representative of an environment appearing within the FOV;

responsive to determining a presence of an indicia within the first region of the FOV, at least one of (i) transmitting the image data to a decoder module, (ii) decoding the indicia by the decoder module, or (iii) generating a successful decode operation; and responsive to determining a presence of the indicia within the second region of the FOV, at least one of (i) not transmitting the image data to the decoder module, (ii) not decoding the indicia by the decoder module, or (iii) not generating a successful decode operation.

2. The method of claim 1, wherein the first illumination assembly comprises one or more light emitting diodes, and the one or more light emitting diodes provide the first illumination.

3. The method of claim 1, wherein the first illumination comprises infrared light.

4. The method of claim 1, wherein the first illumination comprises radiation having a wavelength greater than 700 nm.

5. The method of claim 1, further comprising providing second illumination to the FOV.

6. The method of claim 5, wherein the first illumination comprises infrared light, and the second illumination comprises visible light.

7. The method of claim 5, wherein the first illumination comprises white light, and the second illumination comprises visible light having a color wavelength in the visible spectrum.

8. The method of claim 1, wherein the first illumination is spatially masked to provide masked illumination to the region of space.

9. The method of claim 1, wherein the first illumination comprises a structured light pattern.

10. The method of claim 9, further comprising:

capturing, by the imaging assembly, image data of the structured light pattern; and determining, from the image data of the structured light pattern, a distance from the imaging assembly to the indicia.

11. A system for decoding encoded data appearing within a field of view (FOV) of an indicia reader, the system comprising:

an imaging assembly configured to capture images of the FOV of the indicia reader;

a first illuminator configured to provide first illumination to a first region of the FOV, the FOV further having a second region of the FOV that does not receive the first illumination from the first illumination assembly; and a processor and computer-readable media storage having machine readable instructions stored thereon that, when the machine readable instructions are executed, cause the system to:

provide, by the first illumination assembly, first illumination to a first region of the FOV, the FOV further having a second region of the FOV that does not receive the first illumination from the first illumination assembly;

capture, by the imaging assembly, image data representative of an environment appearing within the FOV;

responsive to determining a presence of an indicia within the first region of the FOV, at least one of (i) transmit the image data to a decoder module, (ii) decode the indicia by the decoder module, or (iii) generate a successful decode operation; and responsive to determining a presence of the indicia within the second region of the FOV, at least one of (i) not transmit the image data to the decoder module, (ii) not decode the indicia by the decoder module, or (iii) not generate a successful decode operation.

12. The system of claim 11, wherein the system further includes a housing having a lower housing with a first window that is in a generally horizontal plane along a top portion of the lower housing, and a raised housing having a second optically transmission window positioned in a generally vertical plane, and wherein the first illuminator comprises two first illuminator sources, with each first illuminator source disposed inside of the raised housing, and the first illuminators disposed at a position and orientation to provide the first illumination such that the first illumination has an illumination field width, near a region of the top portion of the lower housing that is distal from the raised housing, that is approximately within 10% of the width of the top portion of the lower housing.

13. The system of claim 11, wherein the system further includes a housing having a lower housing with a first window that is in a generally horizontal plane along a top portion of the lower housing, and a raised housing having a second optically transmission window positioned in a generally vertical plane, and wherein the first illuminator comprises two first illuminator sources, with each first illuminator source disposed inside of the raised housing at an opposite side of the second optically transmissive window to provide the first illumination through the second optical transmissive window.

14. The system of claim 11, wherein the first illumination comprises radiation having a wavelength greater than 700 nm.

15. The system of claim 11, wherein the machine readable instructions further cause the system to provide second illumination to the FOV.

16. The method of claim 15, wherein the first illumination comprises infrared light, and the second illumination comprises visible light.

17. The system of claim 15, wherein the first illumination comprises white light, and the second illumination comprises visible light having a color wavelength in the visible spectrum.

18. The system of claim 11, wherein the first illumination comprises a structured light pattern.

* * * * *